(12) United States Patent
Lefebvre et al.

(10) Patent No.: US 7,703,270 B2
(45) Date of Patent: Apr. 27, 2010

(54) CABLE CONNECTION FOR A GAS TURBINE ENGINE SAFETY FUEL SHUT-OFF MECHANISM

(75) Inventors: Guy Lefebvre, St-Bruno (CA); Eric Durocher, Verchères (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 959 days.

(21) Appl. No.: 11/181,869

(22) Filed: Jul. 15, 2005

(65) Prior Publication Data

US 2007/0015395 A1 Jan. 18, 2007

(51) Int. Cl.
*F02G 3/00* (2006.01)
*F16C 1/10* (2006.01)

(52) U.S. Cl. .................. 60/39.091; 74/502.4; 74/502.6; 74/500.5; 74/501.5 R

(58) Field of Classification Search .............. 60/39.091, 60/39.094, 226.1, 779; 74/502.4, 502.6, 74/500.5, 501.5 R; 415/1
See application file for complete search history.

(56) References Cited

U.S. PATENT DOCUMENTS

| | | | | |
|---|---|---|---|---|
| 2,930,189 | A | * | 3/1960 | Petrie ........................ 60/39.091 |
| 3,050,939 | A | * | 8/1962 | Morley ..................... 60/39.091 |
| 3,148,423 | A | | 9/1964 | Anspach |
| 3,241,393 | A | * | 3/1966 | Norcross ..................... 74/502.6 |
| 3,292,203 | A | * | 12/1966 | Spencer ........................ 16/66 |
| 3,730,318 | A | * | 5/1973 | Camp ........................ 192/99 S |
| 4,069,721 | A | | 1/1978 | Ezaki et al. |
| 4,088,040 | A | | 5/1978 | Ross-Myring |
| 4,266,439 | A | | 5/1981 | Hayashi et al. |
| 4,738,155 | A | | 4/1988 | Stocker |
| 5,142,935 | A | | 9/1992 | Carr |
| 5,239,817 | A | * | 8/1993 | Mildenstein et al. ..... 60/39.091 |
| 5,431,256 | A | | 7/1995 | Wen |
| 5,927,895 | A | | 7/1999 | Watanabe |
| 5,953,901 | A | * | 9/1999 | Sidiropoulos ............ 60/39.091 |
| 6,213,674 | B1 | | 4/2001 | Sasaki et al. |
| 6,474,190 | B1 | | 11/2002 | Choo |
| 6,607,349 | B2 | * | 8/2003 | Mulera et al. .................. 415/1 |
| 6,776,554 | B2 | | 8/2004 | Acciacca |
| 2007/0289312 | A1 | * | 12/2007 | Daukant ...................... 60/779 |

* cited by examiner

*Primary Examiner*—Vinh T. Luong
(74) *Attorney, Agent, or Firm*—Ogilvy Renault

(57) ABSTRACT

A mistake proof cable assembly for promoting short time engine assembly and method of assembling same. The mistake proof cable assembly comprises a slotted member defining a slot having an open end, and a cable connected to the slotted member and extending longitudinally through the slot. First and second restrainers are mounted on the cable on opposite sides of the slotted member for limiting free movement of the cable in the longitudinal direction of the slotted member. A lock prevents removal of the cable from the slot through the open end thereof.

6 Claims, 3 Drawing Sheets

CABLE CONNECTION FOR A GAS TURBINE ENGINE SAFETY FUEL SHUT-OFF MECHANISM

TECHNICAL FIELD

The invention relates generally to a cable assembly suited for use in fuel shut-off mechanisms of gas turbine engines, and more particularly to a mistake-proof cable assembly.

BACKGROUND OF THE ART

Profitability considerations call for short time assembly. As a result, it has been proposed to build gas turbine engines from pre-assembled units to expedite the manufacturing process. One problem that arises from having pre-assembled units is that not all components thereof are always accessible. This is problematic as time is wasted disassembling parts in order to reposition them. For instance, it has been proposed to manufacture a pre-assembled trailing engine case (TEC) comprising a fuel shut-off mechanism, a safety cable and an engine rear cone. In this particular case, the safety cable is not accessible once the rear cone has been installed to complete the pre-assembled TEC. Due to the fact that the TEC is transported and manipulated prior to and during engine assembly, it therefore becomes advantageous to ensure that the safety cable remains in the proper position.

As a result, mistake-proof assemblies are important to reduce wasted time in assembly.

SUMMARY OF THE INVENTION

It is therefore an object of this invention to provide a mistake-proof cable assembly for promoting short time engine assembly.

In one aspect, the present invention provides a mistake proof cable assembly comprising a slotted member defining a slot having an open end, a cable connected to the slotted member and extending longitudinally through said slot, first and second restrainers mounted on said cable on opposite sides of said slotted member for preventing longitudinal withdrawal of the cable from the slotted member, and a pin extending transversely through the slot preventing removal of said cable from said slot through said open end thereof.

In accordance with a further general aspect of the present invention, there is provided a cable assembly comprising a slotted member defining a slot having an open end, a cable swingable into said slot through said open end about a pivot point on said slotted member, a cable retainer securely mounted to said cable at a distance from said pivot point, said slotted member defining a curved insertion path along which said cable retainer is swung together with the cable to an operation position wherein the cable retainer cooperates with the pivot point to prevent longitudinal withdrawal of the cable from the slot, and a lock to at least limit reverse swinging motion of the cable in the slot.

In another aspect, the present invention provides a gas turbine engine safety fuel shut-off mechanism for engaging a fuel control unit to stop a flow of fuel in the event of a turbine shaft rupture, the mechanism comprising a trigger, a lever actuable by said trigger, a slot defined in the lever, the slot having an open end, a cable assembly coupled at a first end thereof to the lever and at a second end thereof to the fuel control unit, the cable assembly having a cable extending longitudinally through the slot, first and second stoppers mounted on the cable on opposite sides of the lever for preventing longitudinal withdrawal of the cable from the lever, and a locking member preventing removal of the cable from the slot through the open end thereof.

In yet another aspect, the present invention provides a method of assembling a cable to a slotted member defining a slot having an open end, the method comprising the steps of: a) restraining the longitudinal movement of the cable at opposite sides of the slotted member, and b) independently from step a), restraining the cable from moving out of the slot through said open end thereof.

Further details of these and other aspects of the present invention will be apparent from the detailed description and figures included below.

DESCRIPTION OF THE DRAWINGS

Reference is now made to the accompanying figures depicting aspects of the present invention, in which.

DETAILED DESCRIPTION OF THE PREFERRED EMBODIMENTS

Figure 1:
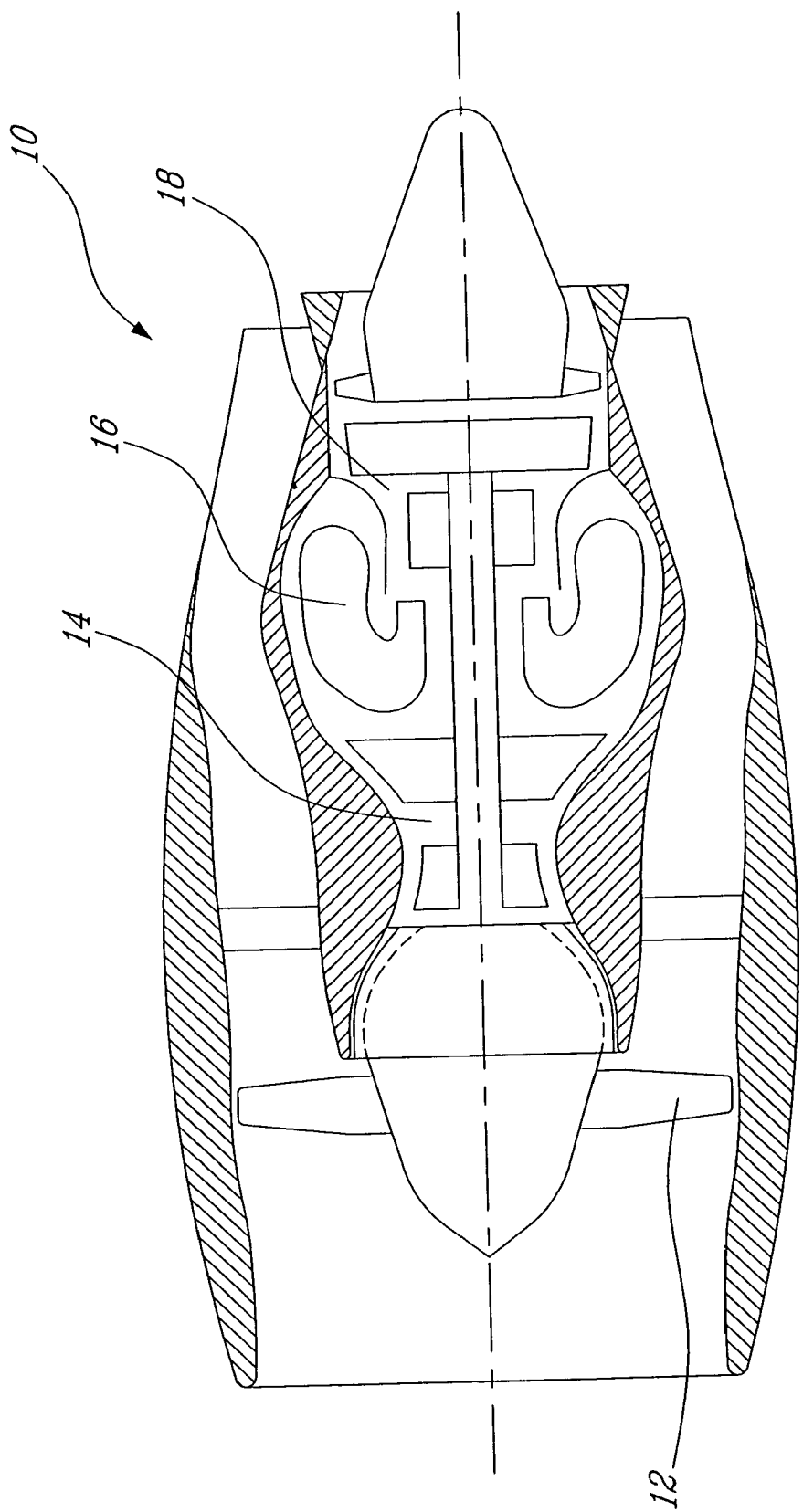
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

Figure 2:
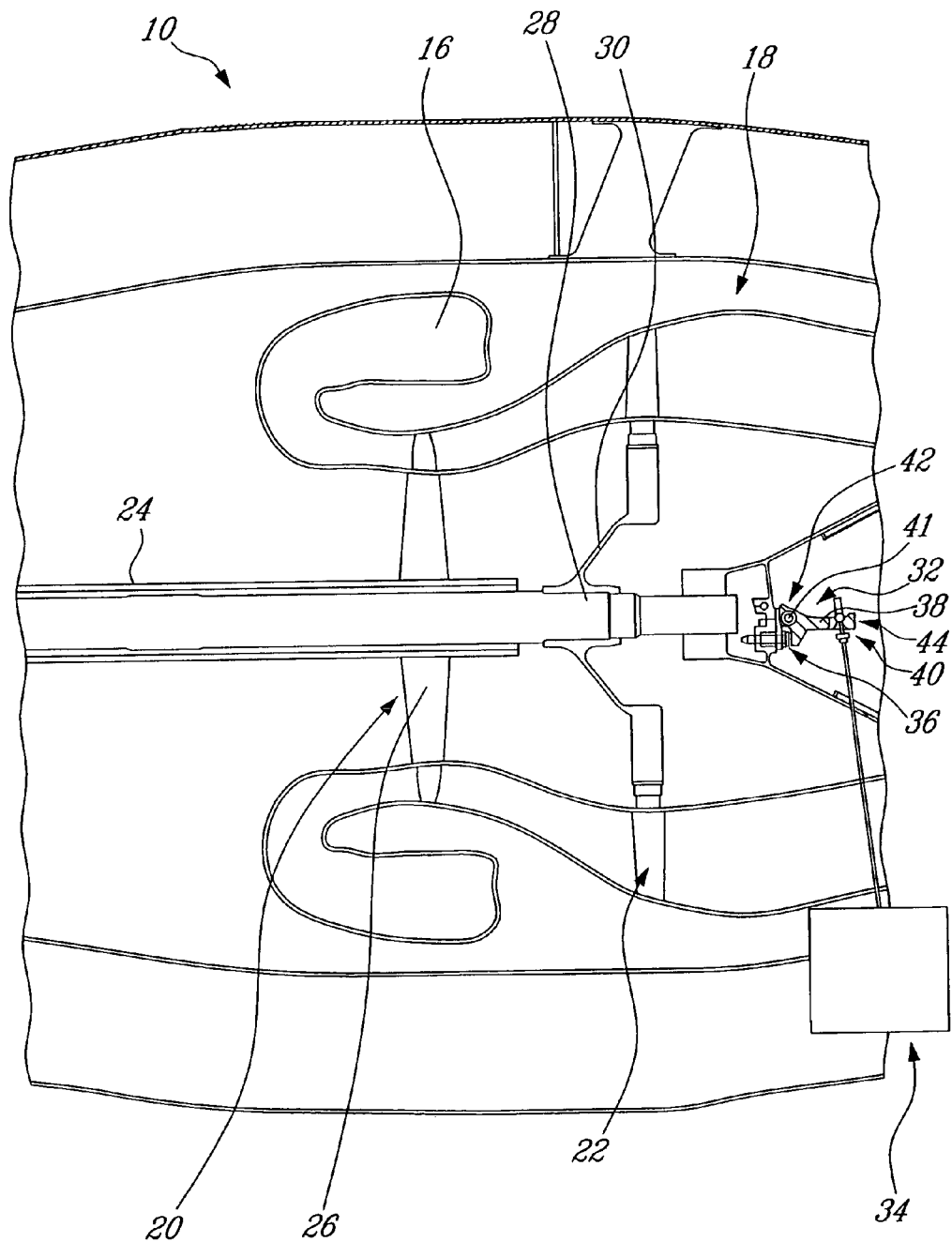
FIG. 2 is an axial cross-sectional view of a combustion section of the gas turbine engine of FIG. 1, showing a fuel shut-off mechanism incorporating a cable assembly attachment in accordance with a preferred embodiment of the present invention.

FIG. 2 illustrates the combustion section showing the combustor 16 and turbine section 18 respectively in further detail. It can be seen that a high (HP) pressure turbine 20 is located axially upstream of a multi-stage low pressure (LP) turbine 22. The HP turbine 20 includes a tubular HP shaft 24 connected to an HP turbine disc 26. Similarly, the LP turbine 22 includes an LP shaft 28 connected to an LP turbine disc 30. The LP shaft 24 can be coaxially mounted internally of the HP shaft 24 and is independently rotatable with respect thereto. Just downstream of the LP turbine 22 is shown a safety fuel shut-off mechanism 32 linked to a fuel control unit 34.

One way in which the gas turbine 10 can fail is that the LP shaft 28 may shear; thereby disconnecting the LP turbine disc 30 from the rest of the shaft 28. The turbine section 18 can no longer drive rotation once the LP shaft 28 is sheared, thus the latter will slow down. The speed of the LP shaft 28 is measured by a probe (not shown), to monitor the overall speed of the turbine engine 10, and in part to use this information to control fuel flow. One of the problems associated with a broken LP shaft 28 is that the probe detects the LP shaft 28 slowing down and consequently tries to correct the decrease in speed by signalling the fuel control unit 34 to increasing fuel flow. Since fuel to the combustor 16 drives the HP shaft 24, the increase in fuel flow causes the HP shaft 24 rotation to speed up and run out of control. As the LP shaft 28 speed continues to decrease, fuel flow continues to increase in the attempt to correct the problem; and thus, the HP shaft 24 speed increases out of control until the HP disc 26 simply flies apart.

During an LP shaft 28 shear event, the fuel flow must be shut-off. This is achieved by the fuel shut-off mechanism 32. Once the LP shaft 28 is sheared, the LP disc 30 tends to move rearwardly due to inertia effects. The fuel shut-off mechanism 32 located behind the LP shaft 28 is engaged by the rearward movement of the LP disc 30, thereby in turn triggering the fuel control unit 34 to shut-off the fuel.

As shown in FIG. 2, the fuel shut-off mechanism 32 comprises a trigger 36 adapted to act on a pivotable safety fuel shut-off lever 38. The lever 38 is connected to the fuel control unit 34 via a cable assembly 40. The trigger 36 is in close proximity to the LP shaft 28 such that when the latter moves rearwardly the trigger 36 and the LP shaft 28 make contact thereby activating the fuel shut-off mechanism 32. The trigger 36 is acting on an upstream end 42 of the lever 38 while the cable assembly 40 is connected to an opposite downstream end 44 of the lever 38. The upstream end 42 of the lever 38 is mounted on a pivot 41. Upon triggering of the trigger 36 by the LP disc 30, the lever 38 is caused to pivot upwardly about pivot 41 to shut-off the fuel control unit 34 via the cable assembly 40.

Figure 3:
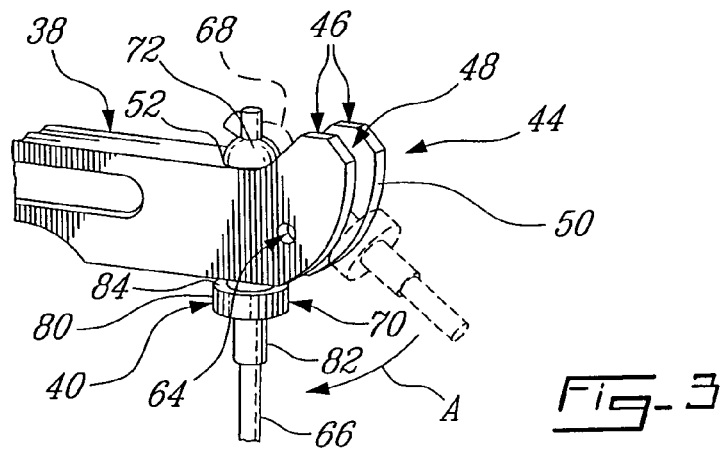
FIG. 3 is a perspective view showing the fuel shut-off cable installation.
Figure 4:
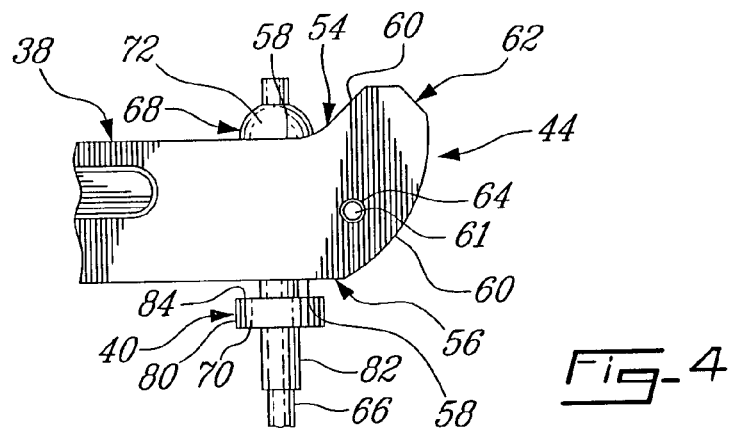
FIG. 4 is a side elevational view showing the cable once installed on the lever of the fuel shut-off mechanism.

Referring now concurrently to FIGS. 3 and 4, a preferred embodiment of the mistake-proof cable assembly comprising the lever 38 and safety cable assembly 40 is illustrated. The downstream end 44 of the lever 38 splits into a pair of parallel fingers 46, extending in the axial direction, defining a U-shaped slot 48 therebetween. The slot 48 having an open end 50 and a semi-circular closed end 52 through which the parallel fingers 46 unite. The parallel fingers 46 have top and bottom edges 54 and 56, each defining a straight portion 58 merging into a curved portion 60. The curved portions 60 of both the top and bottom edges 54 and 56 curve upwards to form rounded extremities 62. The parallel fingers 46 also include aligned circular apertures 64 for receiving a cotter pin 61 therethrough; such that the pin 61 extends in the transverse direction through the slot 48. Preferably, the pin 61 extends perpendicular to the axial direction of the slot 48.

Still referring to FIGS. 3 and 4, in this exemplary embodiment the cable assembly 40 comprises a cable 66 for extending through the slot 48 between the fingers 46. A cable retainer or anchoring member, which could for instance be provided in the form of a ball element 68 is securely attached to an upper end of the cable 66. A second cable retainer, such as a flange 70, is fixedly mounted to the upper end of the cable 66 at a predetermined distance from the ball element 68. The cable 66 is axially captively retained in the slot 48 by the ball element 68 and the flange 70 mounted on the cable 66 on opposite sides of the lever 38. The ball element 68 and the flange 70 limit the longitudinal (or radial) movement of the cable 66 in the slot 48, such that the cable 66 has a limited freedom of up and down movement. Longitudinal withdrawal of the cable 66 from the slot 48 is thus prevented by the ball element 68 and the flange 70.

Particularly, the ball element 68 includes a ball 72 with a cylindrical sheath (not shown) projecting downwardly therefrom. The ball 72 having a bore 76 inline with the through of the cylindrical sheath such that the cable 66 passes through the cylindrical sheath into the bore 76 and extends out the top of the ball 72. The ball element 68 is fixedly mounted on the top end 78 of the cable 60 adapted to be seated in a semi-hemispherical recess defined in the top surface of the lever 38 at the semi-circular closed end 52 thereof. Thus, the semi-circular closed end 52 portion of the slot 48 acts as a seat for the ball element 68. Preferably, the diameter of the ball 72 is slightly greater than the width of the slot 48 between the parallel fingers 46 so as to prevent the ball element 68 from sliding through the slot 48. Hence, the ball element 68 is seated within the slot 48 partially protruding therefrom above the straight portions 58 of the top edges 54 of the parallel fingers 46. The curved portions 60 of the top edges 54 help prevent the ball element 68 from moving axially downstream along the slot 48 acting as a stopper. This is due to the fact that the force of gravity helps keep the ball element 68 from sliding up the curved portion 60 in a case where no external forces are being applied to the ball element 68.

FIGS. 3 and 4 show a preferred embodiment of the flange 70 of the cable assembly 40. Preferably, the flange 70 has first and second cylindrical portions 80 and 82 respectively. The first cylindrical portion 80 having an outside diameter greater than the width of the slot 48 and preferably also greater than the outside diameter of the second cylindrical portion 82. The first cylindrical portion 80 also having a straight, flat upper surface 84 for abutting the bottom edges 56 of the parallel fingers 46 when the cable 66 is moved upwardly through the slot 48. The flange 70 is fixedly mounted to the cable 66 below the lever 38 such that when the ball element 68 is seated in the slot 48, the upper surface 84 of the first cylindrical portion 82 is in spaced relation with the bottom edges 56 of the parallel fingers 46. The flange 70 prevents reverse movement of the ball element 68 out of the slot 48 in which the cable 66 is inserted.

The method of assembling the mistake-proof cable assembly 40 entails restraining the longitudinal movement of the cable assembly 40 about opposite ends of the lever, and restraining the cable assembly 40 from moving transversely in the slot 48. The cable assembly 40 is generally pre-assembled with the ball element 68 and flange 70 mounted on the cable 66 prior to being coupled to the lever 38. FIG. 3 illustrates the possible motion of the cable assembly 40 with respect to the lever 38 when being installed. More specifically, the ball 72 is seated adjacent the semi-circular closed end 52 of the slot 48 and the cable 66 is then swung downwardly within the slot 48, as shown by arrow A. The ball 72 is free to pivot axially within the slot 48 but is refrained from undergoing axial displacement along the top edges 54 by the curved portions 60 thereof. As the cable 66 is swung axially, the flange 70 also undergoes axial displacement such that the upper surface 84 of the first cylindrical portion 80 thereof contours the curved portions 60 of the bottom edges 56.

According to one embodiment, the cable assembly 40 is mounted on the lever 38 such that the flange 70 is able to slide along the curved portions 60 of the bottom edges 56, which acts as an insertion ramp. The radius of curvature of the curved portions 60 of the bottom edges 56 is substantially equal to the distance from the center of the ball 72 to the upper surface 84 of the flange 70. Thus, the curved portion 60 of the bottom edges defines an arcuate insertion path to permit the swinging motion of the flange 70 about the center of the pivoting ball 72. Furthermore, the force of gravity urges the cable 66 to find a position of equilibrium in the vertical longitudinal direction with the ball 72 resting in the slot 48. This arrangement provides for easy and reliable assembly as compared to known spring loaded connections.

In order to ensure that the cable assembly 40 remains in proper position regardless of the manner in which the fuel shut-off mechanism 32 is manipulated, the cotter pin 61 is then inserted through the circular apertures 64 defined in the parallel fingers 46. The pin 61 restrains the cable 66 from moving out of the open end 50 of the slot 48. Other types of locks could be used to prevent reverse motion of the flange 70 about the ball 72.

Figure 5:
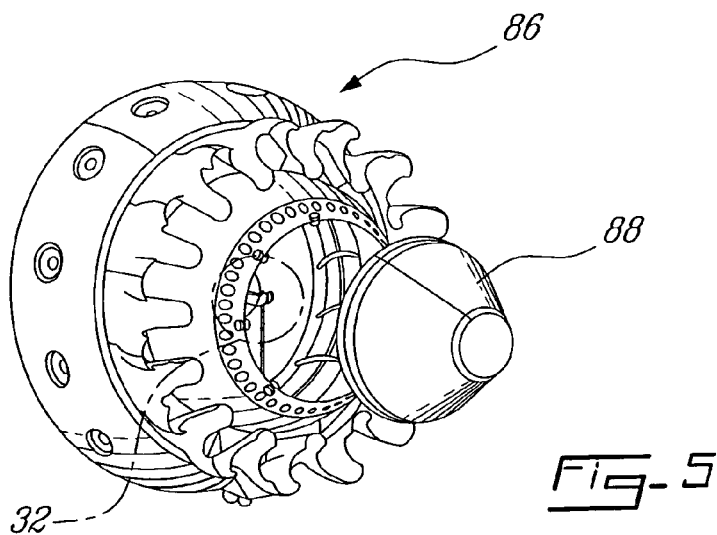
FIG. 5 is an exploded view of a trailing engine case (TEC) assembly of the gas turbine engine, a rear cone of the assembly being removed to show the fuel shut-off mechanism of FIGS. 3 and 4.

Thus, in the case where the fuel shut-off mechanism 32 comes pre-assembled as part of a trailing engine case (TEC) assembly 86 as shown in FIG. 5, it is advantageous for the longitudinal and transverse movement of the cable assembly 40 to be limited. Since there is no access to the shut-off mechanism 32 when the rear cone 88 is assembled, providing a fuel shut-off mechanism 32 having a cable assembly 40 that will always be sited properly is important to reduce wasted time in engine assembly.

Therefore, the preferred embodiment of the fuel shut-off mechanism 32, which comprises the ball element 68 and the flange 70 mounted to the cable 66 on opposite sides of the lever 38, advantageously refrains the ball element 68 from moving out of the slot 48 either longitudinally or transversely. Thus, the preferred embodiment of the fuel shut-off mechanism 32 ensures that the cable 66 remains in position prior to and during engine assembly.

The above description is meant to be exemplary only, and it should be understood that the mistake-proof cable assembly embodied as part of a fuel shut-off mechanism may also be employed for other applications in different areas of the engine. The present invention does not only apply to a turbine engine with a reverse flow combustor as illustrated in FIGS. 1 and 2, but to any engine. Also, one skilled in the art will recognize that changes may be made to the embodiments described without department from the scope of the invention disclosed. For example, the flange may be provided in many shapes and sizes. It may also be provided as a weighted member for pulling the cable and therefore the ball element downwardly. Another example may consist of having a slot with a varying width to further refrain the ball element from moving longitudinally or transversely. Still other modifications which fall within the scope of the present invention will be apparent to those skilled in the art, in light of a review of this disclosure, and such modifications are intended to fall within the appended claims.

The invention claimed is:

1. A gas turbine engine safety fuel shut-off mechanism for interrupting fuel flow to an engine in the event of a turbine shaft rupture, the mechanism comprising a fuel control unit controlling fuel flow to a combustor section of the engine, a trigger, a lever actuated by said trigger upon detection of the turbine shaft rupture, a slot defined in the lever, the slot having an open end, a cable assembly coupled at a first end thereof to the lever and at a second end thereof to the fuel control unit, the cable assembly having a cable extending longitudinally through the slot, first and second cable retainers mounted on the cable on opposite top and bottom sides of the lever for preventing longitudinal withdrawal of the cable from the lever, the first cable retainer being received in a seat defined in the top side of the lever, the second cable retainer being positioned adjacent to the bottom side of the lever, the second cable retainer abutting the bottom side of the lever to prevent the first cable retainer from being moved out of the seat when the cable is moved upwardly, and a locking member extending transversely through the slot and blocking passage of the cable through the open end of the slot, wherein said open end is selectively obstructed by said locking member, the locking member including a pin removably inserted in holes defined in said lever transversally of the slot, and wherein the actuation of the lever by the trigger is transmitted to the fuel control unit in order to shut down fuel flow.

2. The gas turbine engine safety fuel shut-off mechanism of claim 1, wherein said locking member is independent of said first and second cable retainers.

3. The gas turbine engine safety fuel shut-off mechanism of claim 1, wherein the lever has a pair of axially extending fingers, the slot being defined between said fingers, and wherein said fingers have an upwardly extending distal end portion at said open end.

4. The gas turbine engine safety fuel shut-off mechanism of claim 3, wherein said upwardly extending distal end portion defines a curved distal edge providing the required clearance to permit pivoting of the cable about said first cable retainer in order to position the second cable retainer underneath said lever prior to the installation of said locking member.

5. The gas turbine engine safety fuel shut-off mechanism of claim 3, wherein said upwardly extending distal end portion defines a curved ramp along which said second cable retainer is adapted to fall into a final position when the cable is swung into the slot about said first cable retainer.

6. The gas turbine engine safety fuel shut-off mechanism of claim 1, wherein the lever and the cable are mounted in a pre-assembled trailing engine case, a connection between the cable and the lever being non-accessible from outside of the pre-assembled trailing engine case.

* * * * *